US012281437B2

(12) United States Patent
Sigvardt et al.

(10) Patent No.: US 12,281,437 B2
(45) Date of Patent: Apr. 22, 2025

(54) METHOD FOR FABRICATING A STRING, IN PARTICULAR A STRING FOR A BOWED MUSICAL INSTRUMENT, AND AN APPARATUS FOR CARRYING OUT THE SAME

(71) Applicant: Larsen Strings A/S, Sønderborg (DK)

(72) Inventors: Kristian Bach Sigvardt, Copenhagen (DK); Laurits Thorvald Larsen, Sonderborg (DK)

(73) Assignee: Larsen Strings A/S, Sønderborg (DK)

( * ) Notice: Subject to any disclaimer, the term of this patent is extended or adjusted under 35 U.S.C. 154(b) by 717 days.

(21) Appl. No.: 16/967,479

(22) PCT Filed: Feb. 9, 2018

(86) PCT No.: PCT/EP2018/053249
§ 371 (c)(1),
(2) Date: Aug. 5, 2020

(87) PCT Pub. No.: WO2019/154505
PCT Pub. Date: Aug. 15, 2019

(65) Prior Publication Data
US 2021/0214891 A1 Jul. 15, 2021

(51) Int. Cl.
*D07B 1/04* (2006.01)
*D07B 3/00* (2006.01)
*G10D 3/10* (2006.01)

(52) U.S. Cl.
CPC ................. *D07B 1/04* (2013.01); *D07B 3/00* (2013.01); *G10D 3/10* (2013.01);
(Continued)

(58) Field of Classification Search
CPC . D07B 7/00; D07B 7/022; D07B 7/14; D07B 7/12; D07B 3/00; D07B 3/08;
(Continued)

(56) References Cited

U.S. PATENT DOCUMENTS 784,030 A * 3/1905 Bubolz .................... D07B 7/14 57/13
1,573,933 A * 2/1926 Guest ..................... H01C 17/04 242/484.4
(Continued)

FOREIGN PATENT DOCUMENTS

DE 2736467 A1 2/1979
GB 2073469 A 10/1981

OTHER PUBLICATIONS

PCT/EP2018/053249; PCT International Search Report and Written Opinion of the International Searching Authority dated Oct. 18, 2018.

*Primary Examiner* — Uyen T Nguyen
(74) *Attorney, Agent, or Firm* — Renner, Otto, Boisselle & Sklar, LLP

(57) ABSTRACT

Method for fabricating a string, in particular a string for a bowed musical instrument, said string having a core with at least one winding strand helically wound thereon, the method comprising: placing a core axially along a path, spinning the core about its central axis and helically winding at least one winding strand around the string, wherein for increasing compactness of the string a friction force is applied to the at least one winding strand by a compactness increasing module at a spinning point, said spinning point being defined as the point where the at least one winding strand is being wound on to the string, consisting of at least one core, and a compression force is applied to the at least one winding strand and the string by the compactness increasing module, when helically winding the at least one winding strand around the string.

27 Claims, 15 Drawing Sheets

Figures 1, 1A, 2, 3, 4:
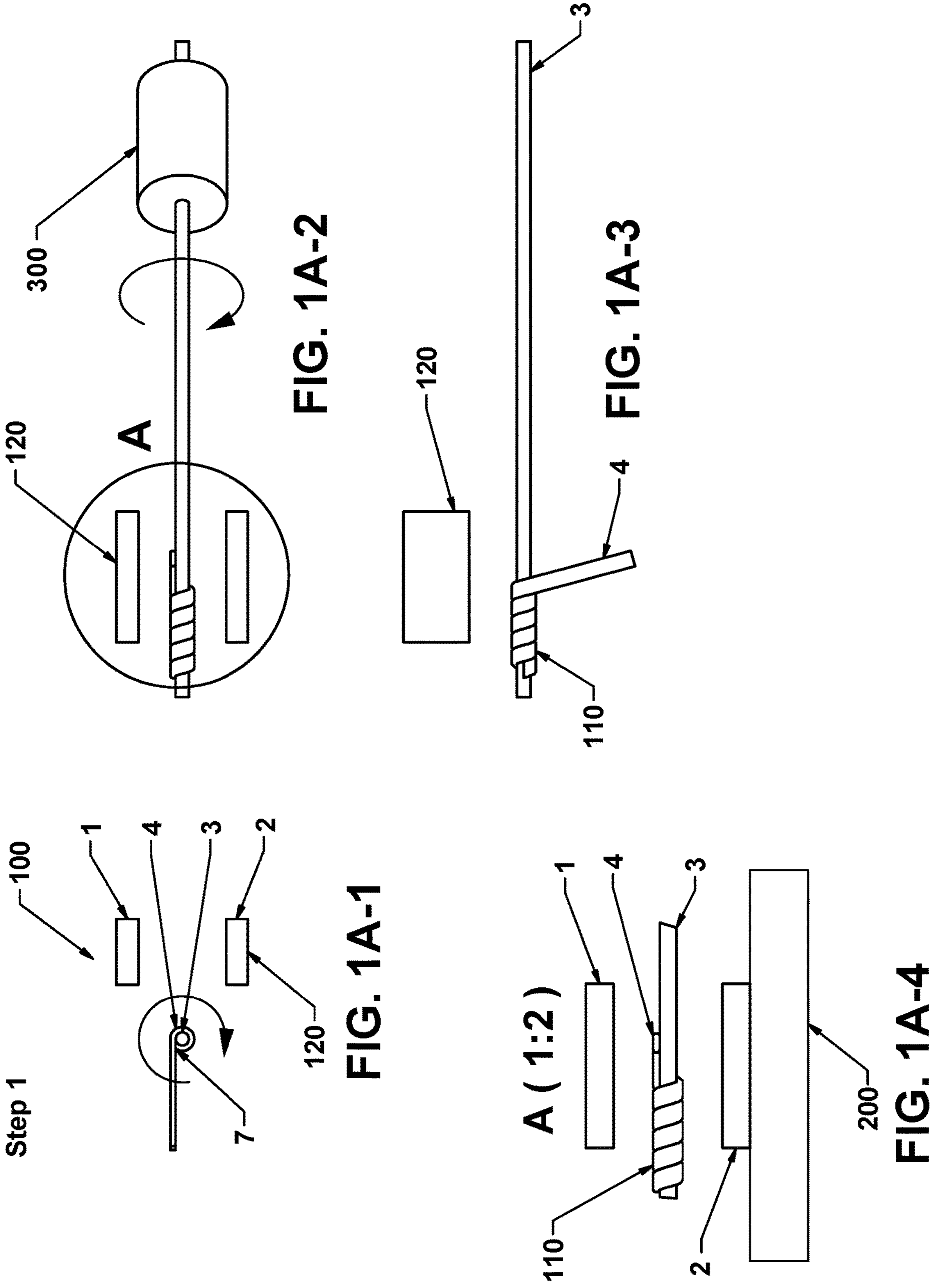
Figures 1, 1B:
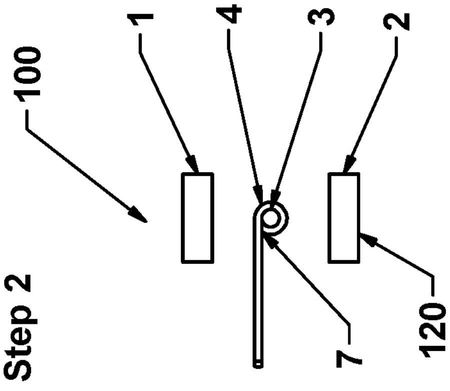
Figures 1, 1B, 2:
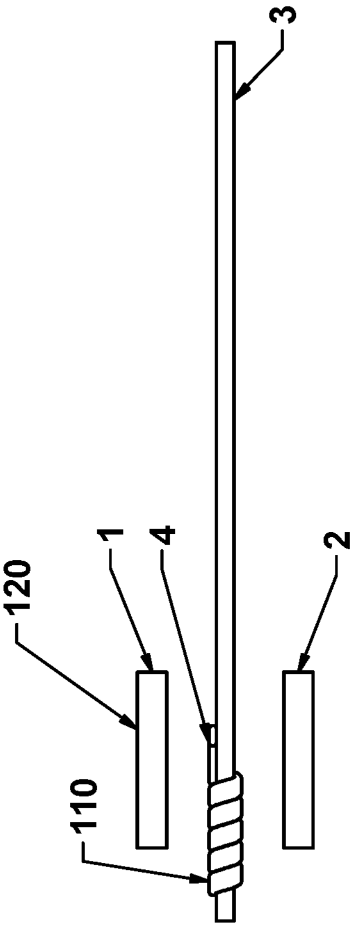
Figures 1, 1B, 2, 3:
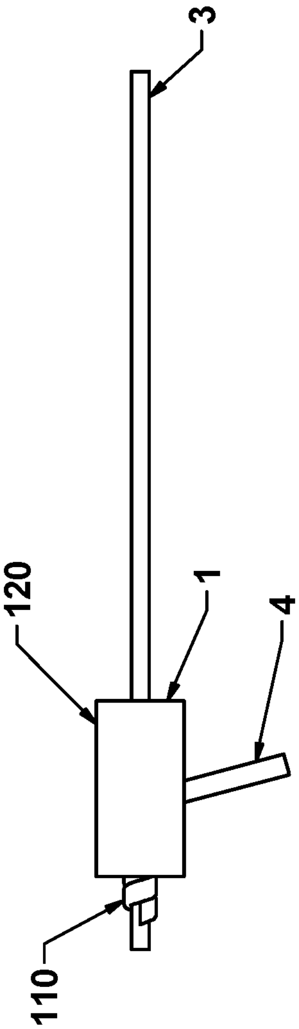
Figures 1, 1C, 2:
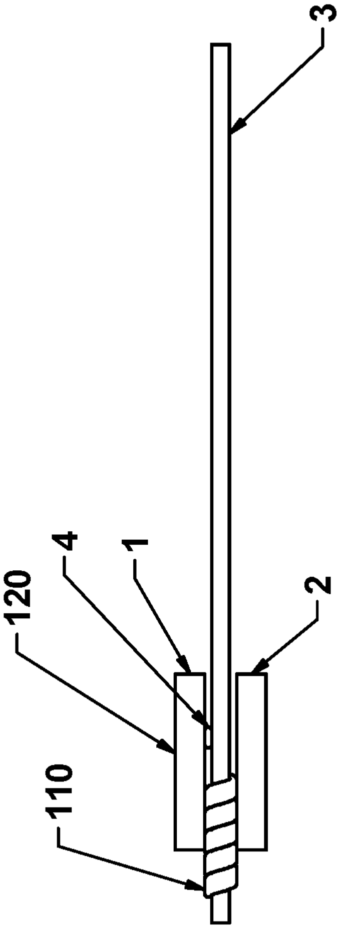
Figures 1, 1C, 2, 3:
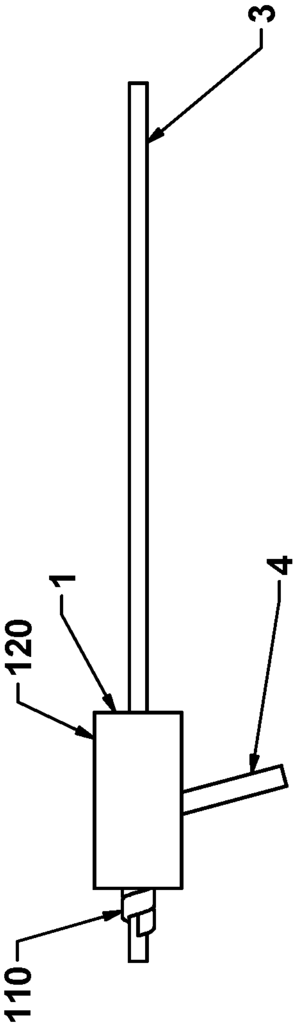
Figures 1, 1C:
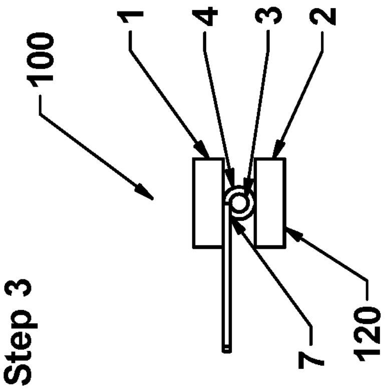
Figures 1, 1D, 2:
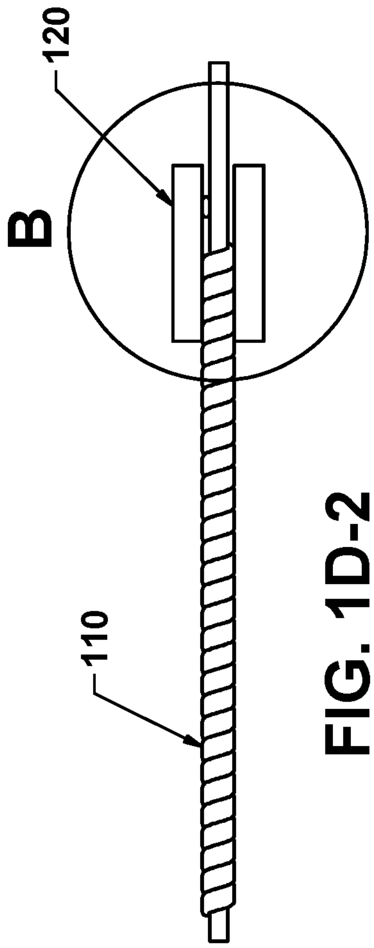
Figures 1, 1D, 2, 3:
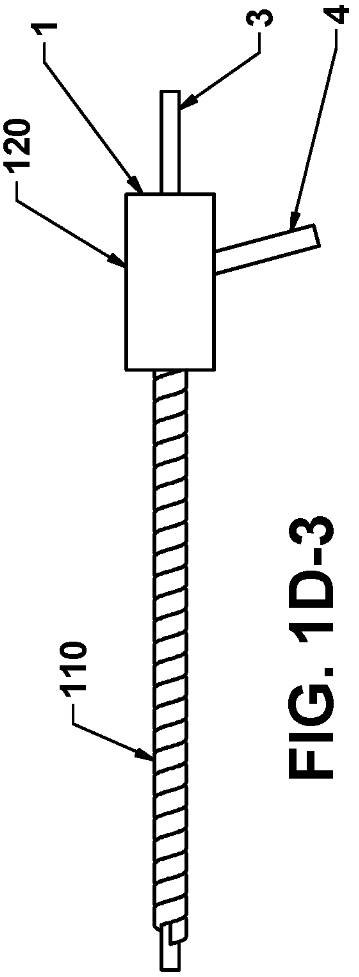
Figures 1, 1D:
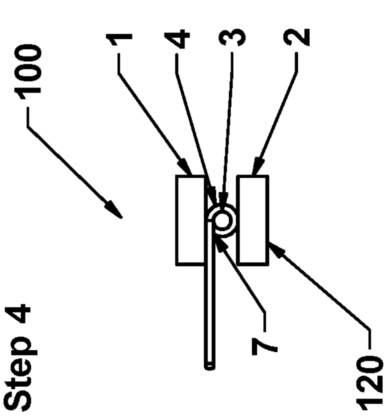
Figures 1, 1D, 2, 3, 4:
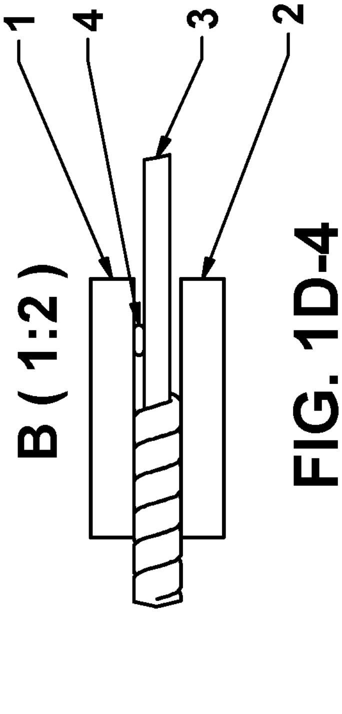
Figures 1, 1E, 2, 3, 4:
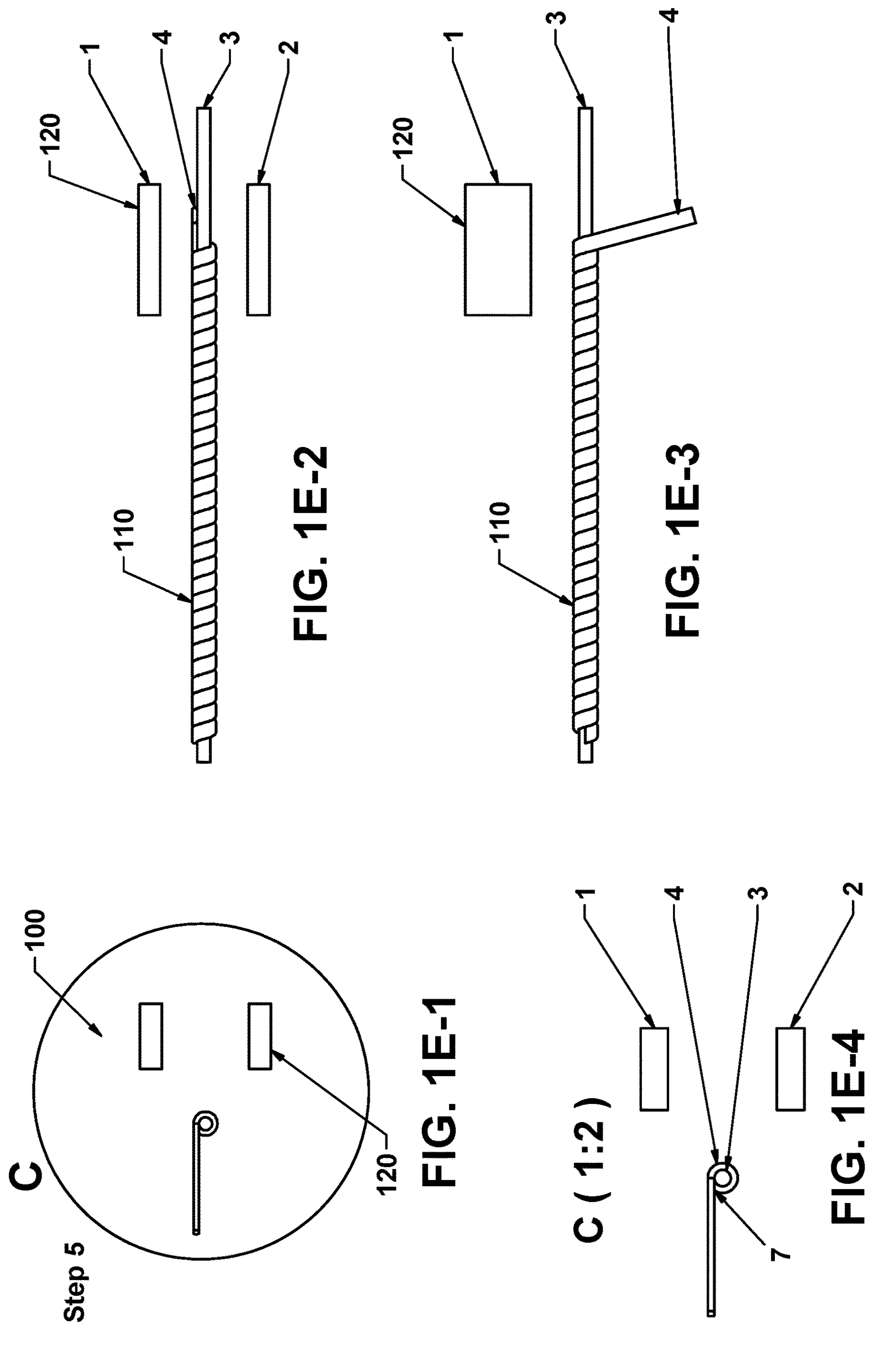
Figures 2, 2A:
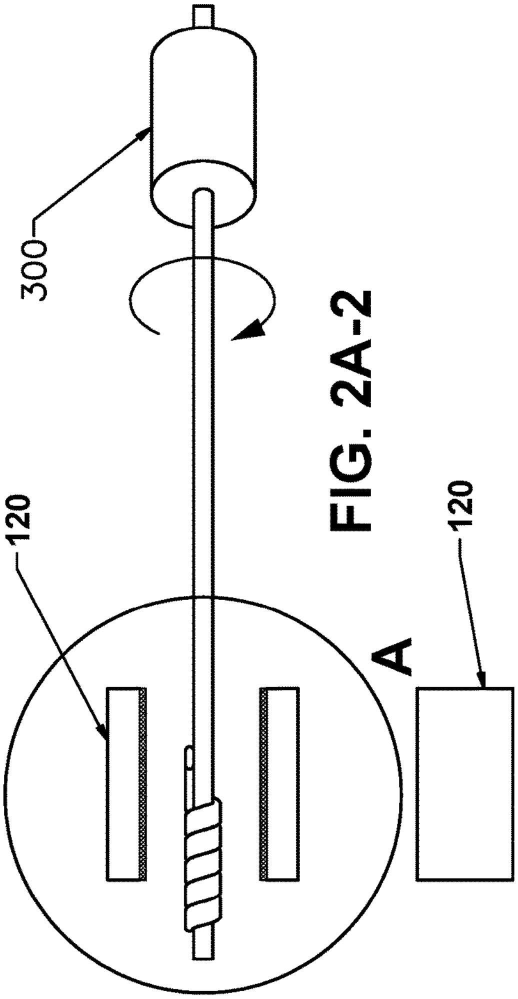
Figures 2, 2A, 3:
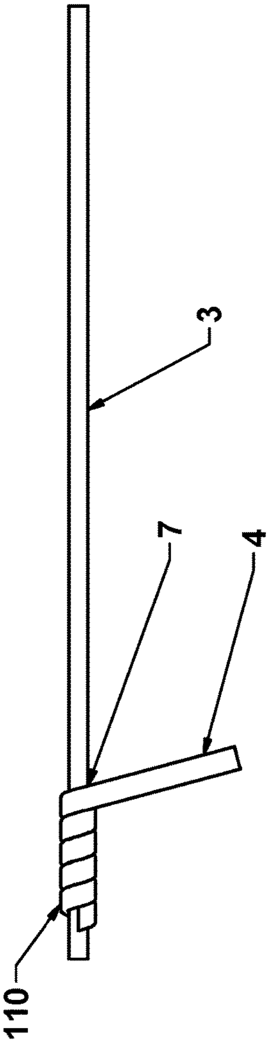
Figures 1, 2A:
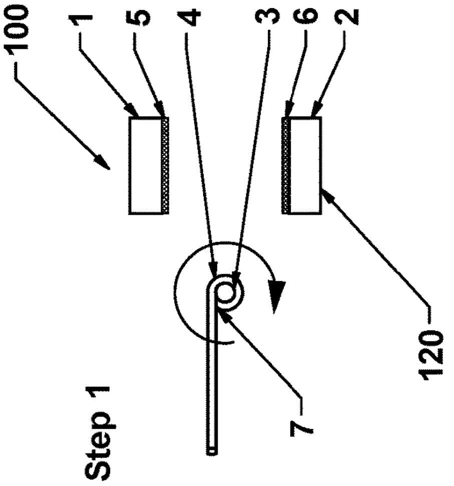
Figures 2, 2A, 3, 4:
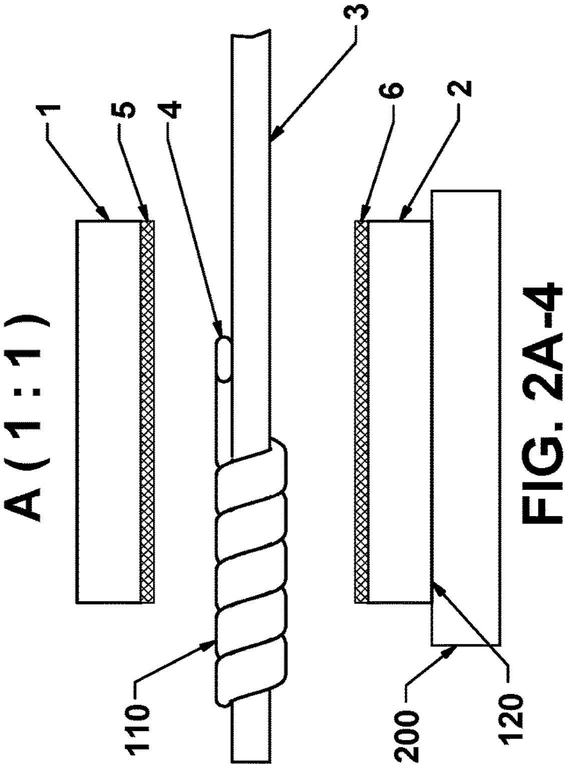
Figures 2, 2B:
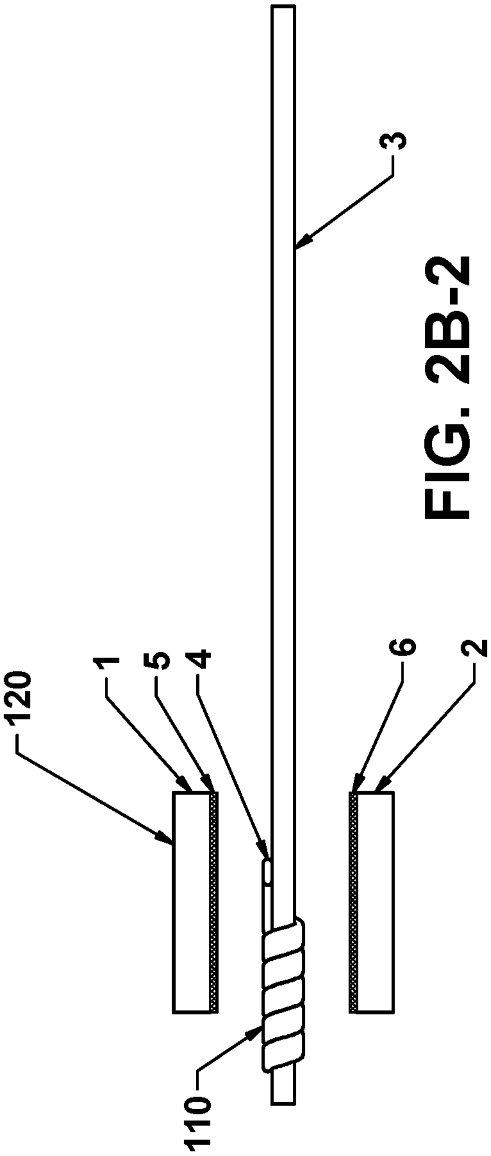
Figures 2, 2B, 3:
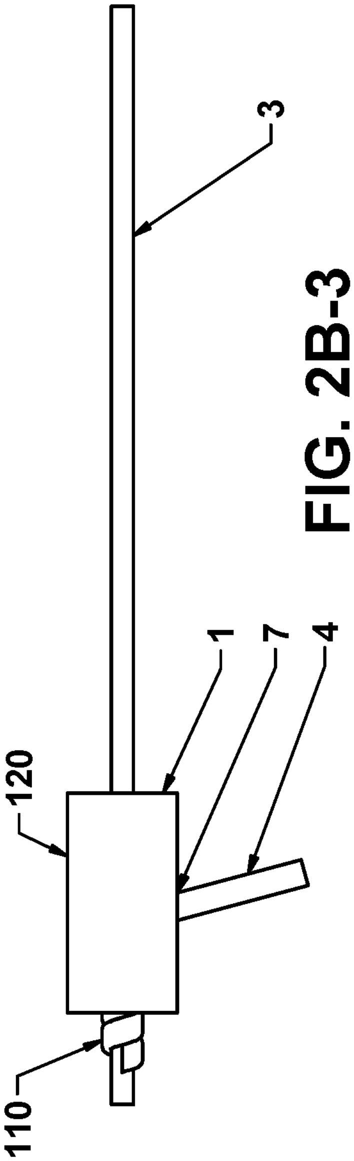
Figures 1, 2B:
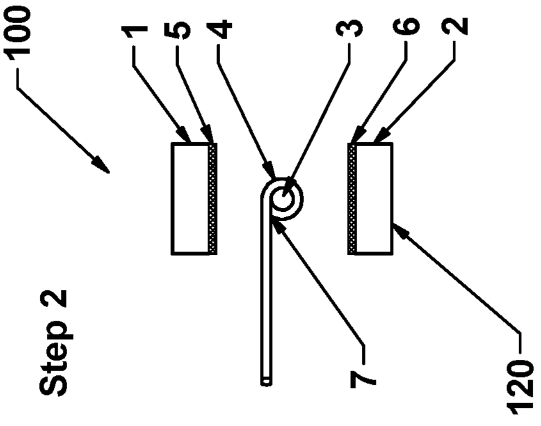
Figures 2, 2C:
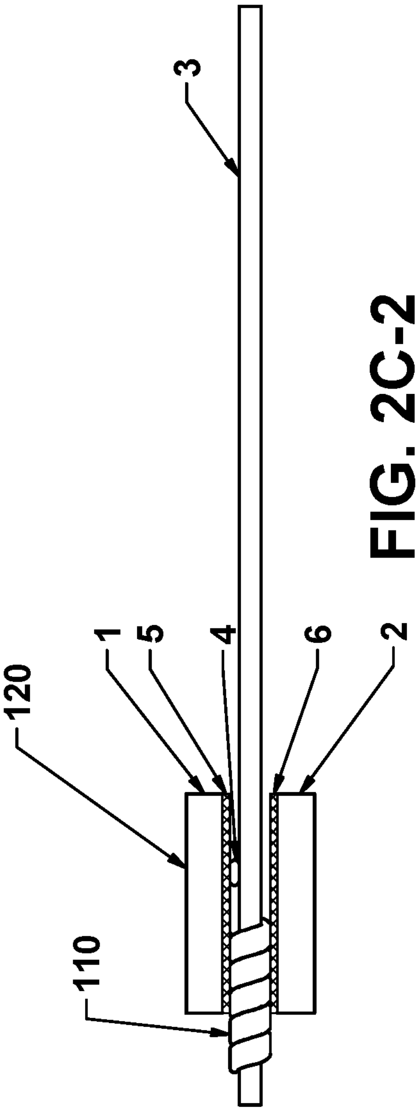
Figures 2, 2C, 3:
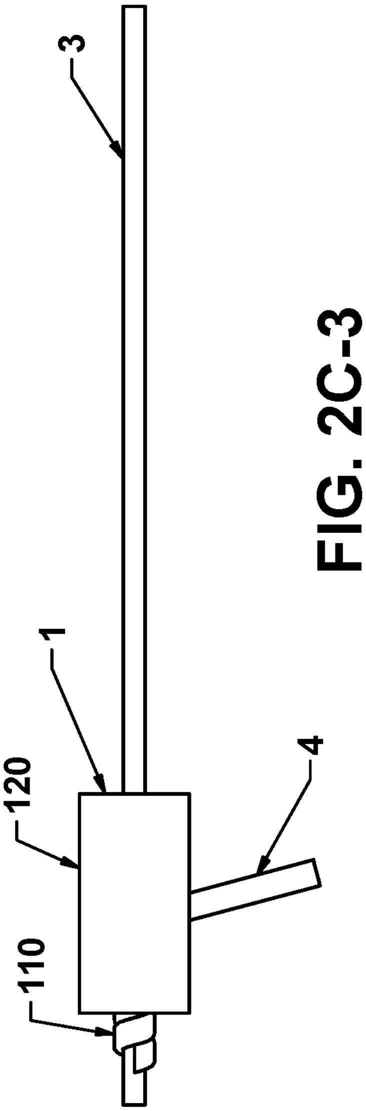
Figures 1, 2C:
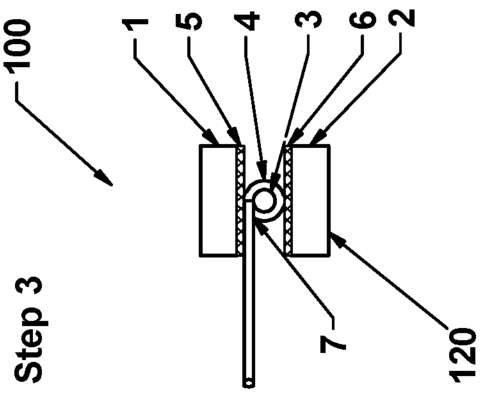
Figures 2, 2D:
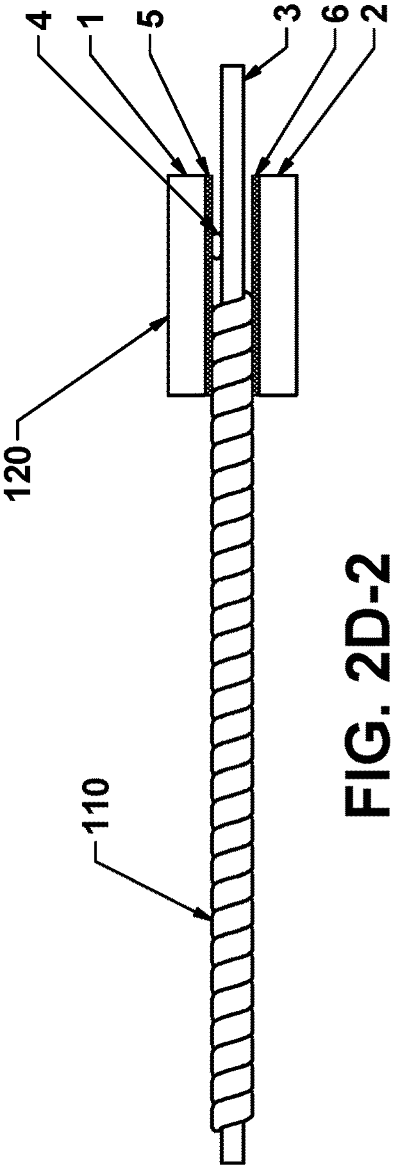
Figures 2, 2D, 3:
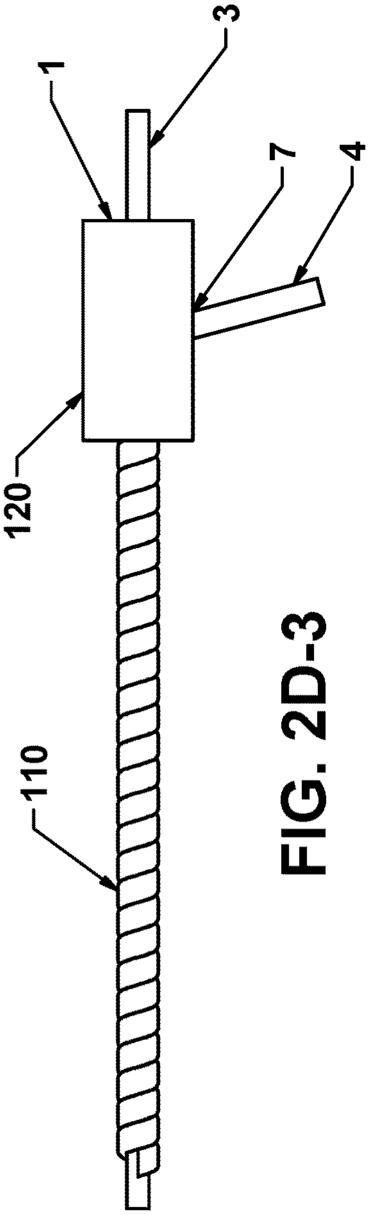
Figures 1, 2D:
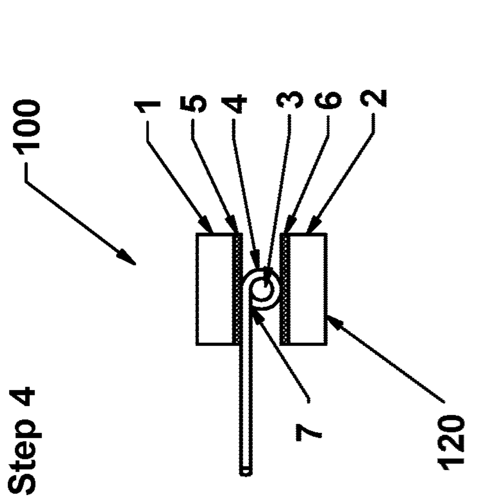
Figures 2, 2E:
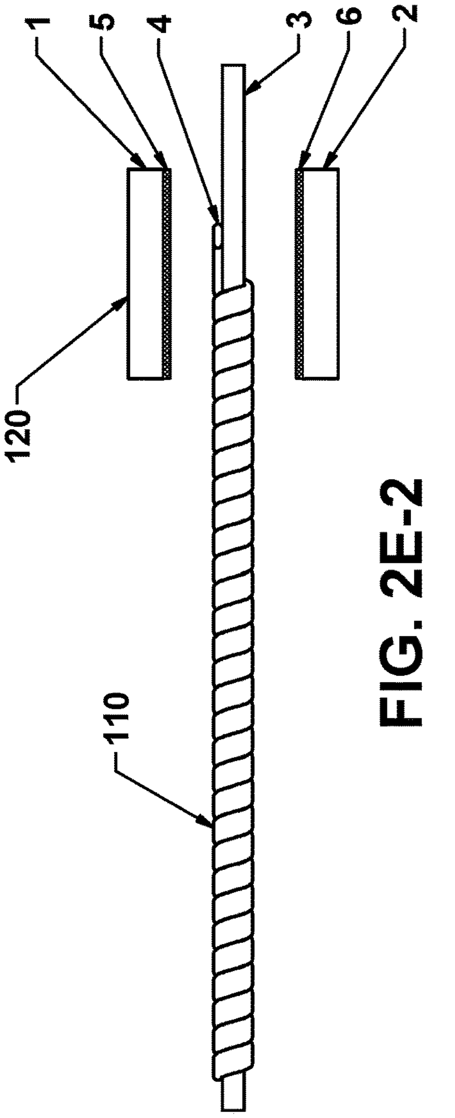
Figures 2, 2E, 3:
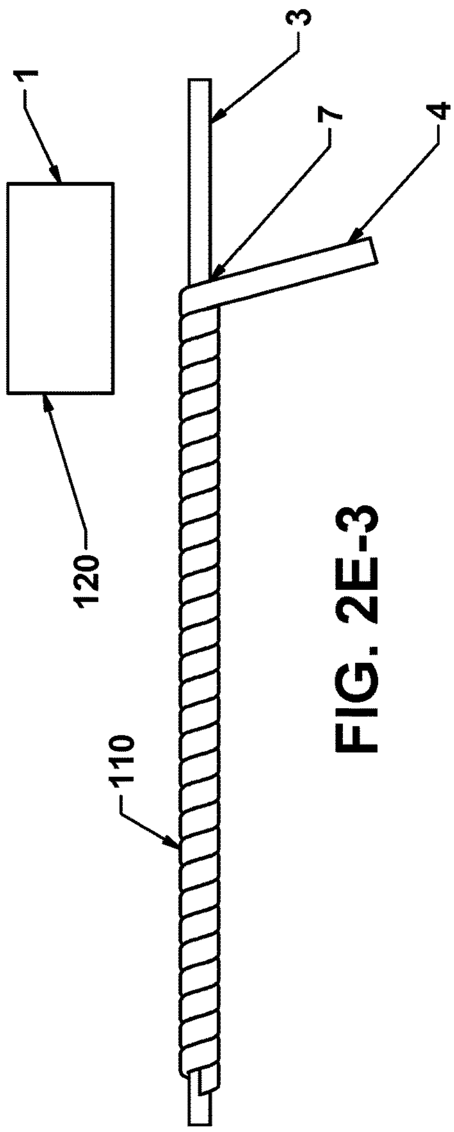
Figures 1, 2E:
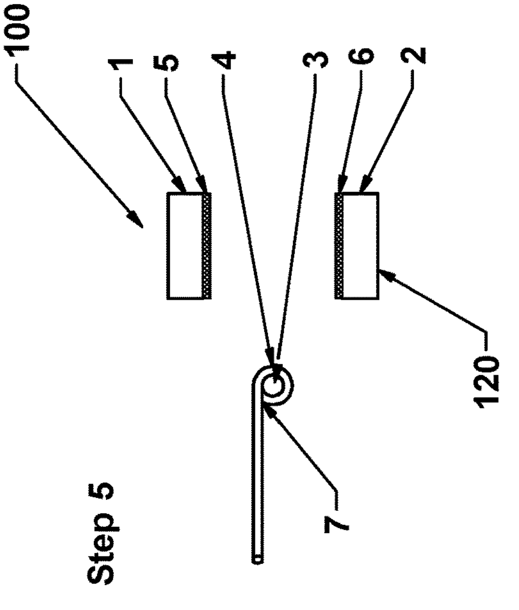
Figures 2, 3:
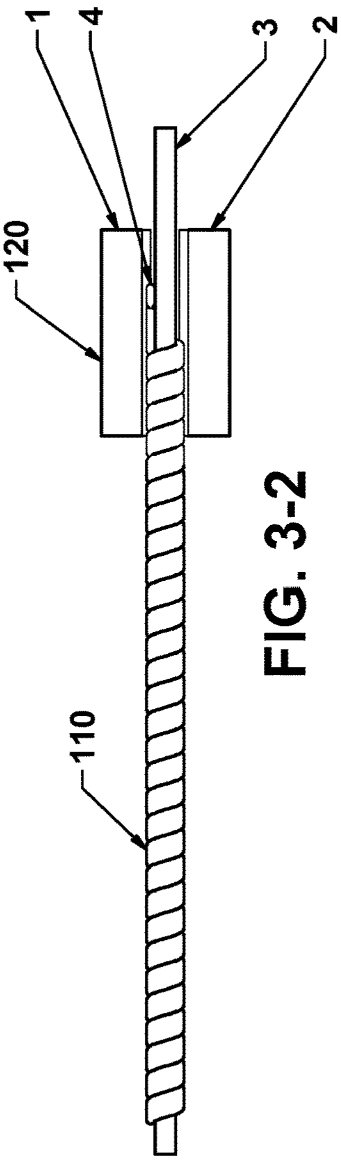
Figure 3:
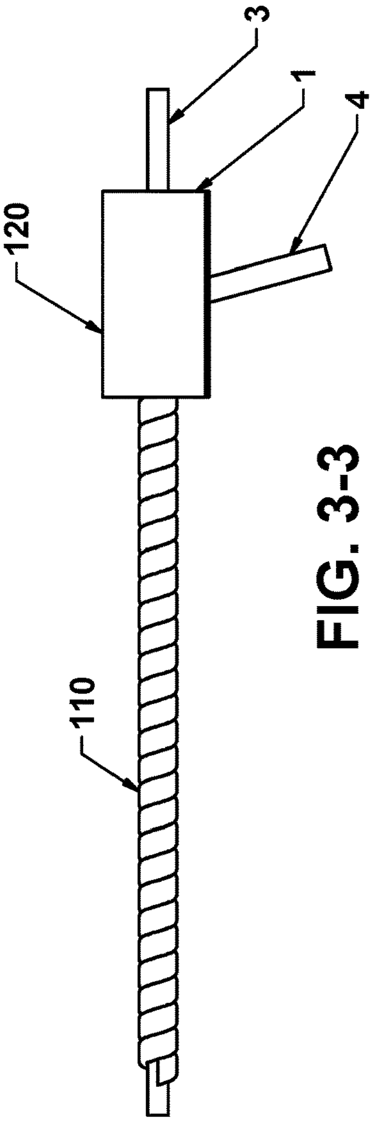
Figures 1, 3:
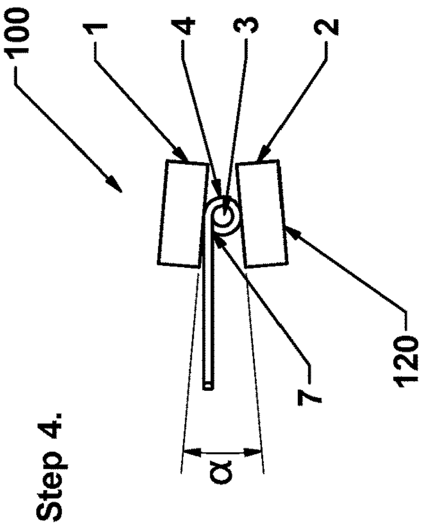
Figures 2, 4:
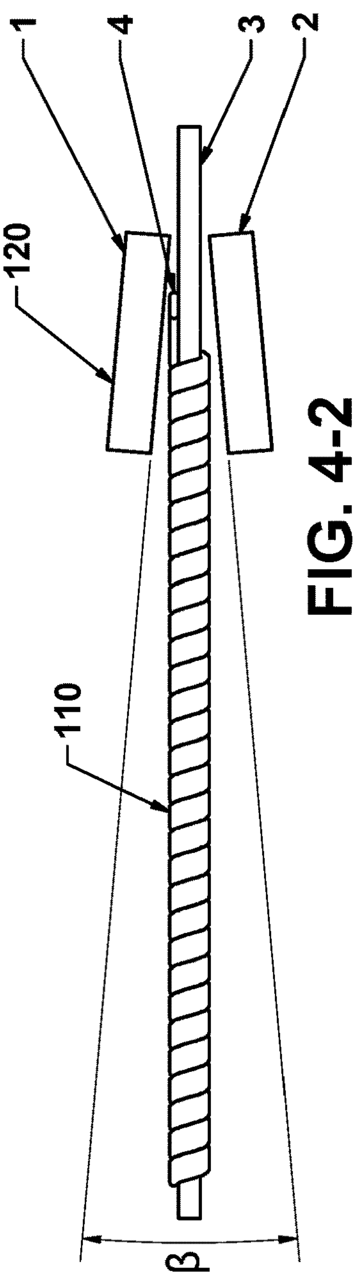
Figures 3, 4:
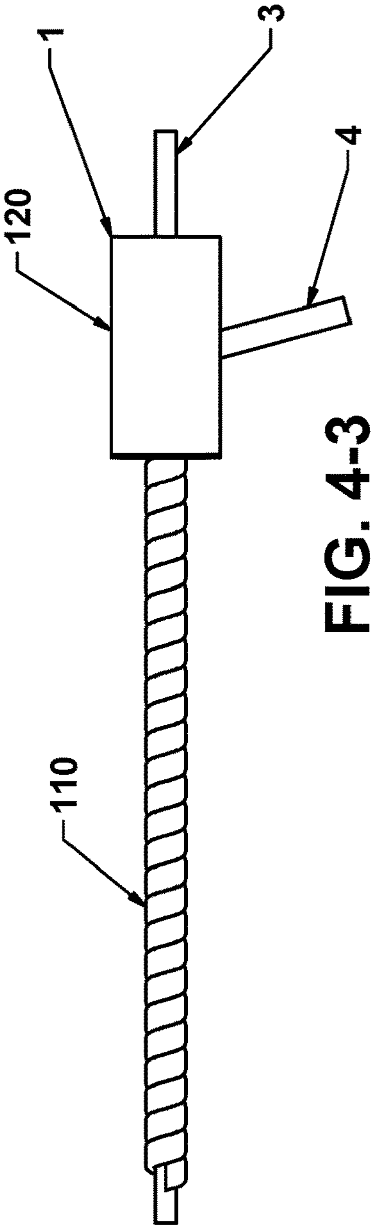
Figures 1, 4:
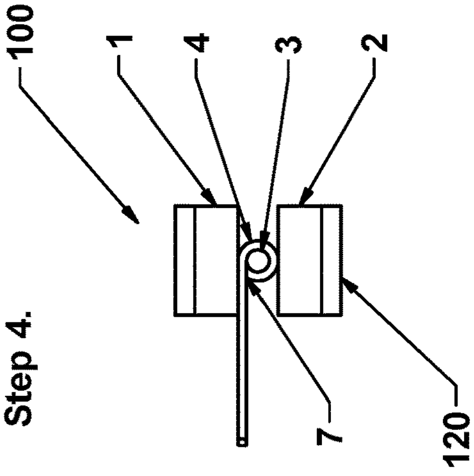

(52) U.S. Cl.
CPC .................. *D07B 2201/102* (2013.01); *D07B 2207/4031* (2013.01); *D07B 2501/40* (2013.01)

(58) Field of Classification Search
CPC .............. D07B 3/085; D07B 2201/102; D07B 2201/2003; D07B 2201/2019; D07B 5/00; D07B 1/0646; D07B 1/0653; D07B 1/08; D07B 2207/4031; D07B 2501/40; D07B 2207/4022; D07B 2207/4027
See application file for complete search history.

(56) References Cited

U.S. PATENT DOCUMENTS 1,887,837 A * 11/1932 Frank ........................ D07B 7/02 57/138
2,461,231 A * 2/1949 Oppenheim ........... B65H 54/68 57/11
3,179,347 A * 4/1965 Drees ........................ B21F 3/04 140/71.5
3,717,987 A * 2/1973 Gilmore ................. D07B 7/027 57/215
3,772,873 A * 11/1973 Hino ...................... D02G 1/087 57/286
3,837,152 A * 9/1974 Dakhov ................... D07B 7/02 57/13
3,990,220 A * 11/1976 Chaffee .................... G10D 3/10 57/11
4,055,038 A * 10/1977 Conklin, Jr. ............. G10D 3/10 57/11
4,144,700 A * 3/1979 Takai ..................... D02G 1/085 57/1 R
4,326,444 A * 4/1982 Markley ................ D07B 5/005 84/297 S
4,338,772 A * 7/1982 Rendell .................... G10D 3/10 57/215
4,365,534 A * 12/1982 Rendell .................... G10D 3/10 84/297 S
4,377,932 A * 3/1983 Dammann ............. D02G 1/087 57/348
4,530,205 A * 7/1985 Seiler ....................... D07B 1/08 57/311
4,700,538 A * 10/1987 Varga ..................... D01G 15/66 19/150
2011/0005365 A1 1/2011 Landtroop
2015/0315742 A1* 11/2015 Lauer ..................... D07B 1/165 57/7
2017/0061939 A1* 3/2017 Hartley .................... G10D 3/10
2017/0297855 A1* 10/2017 Bortz ....................... D07B 3/00
2020/0388419 A1* 12/2020 Martins .................. H01B 11/02
2021/0131030 A1* 5/2021 Shibao ................... D07B 1/148

* cited by examiner

Step 2

Step 3

Step 4

B ( 1:2 )

Step 3

Step 4.

Step 4.

METHOD FOR FABRICATING A STRING, IN PARTICULAR A STRING FOR A BOWED MUSICAL INSTRUMENT, AND AN APPARATUS FOR CARRYING OUT THE SAME

The present application is a U.S. National Stage Application based on and claiming benefit and priority under 35 U.S.C. § 371 of International Application No. PCT/EP2018/053249, filed 9 Feb. 2018, the entirety of which is hereby incorporated herein by reference.

The present invention relates to a method for fabricating a string, in particular a string for a bowed musical instrument, having a core with at least one winding strand helically wound thereon, and a string fabricating apparatus for fabricating a string, in particular a string for a bowed musical instrument, having a core with at least one winding strand helically wound thereon. The string can be a musical instrument string, in particular a string for a bowed instrument, or a musical string for other types of musical instruments, including plucked instruments or it can be a string for non-musical applications, such as sporting equipment or medical applications.

A bowed musical instrument string according to the state of the art consists, most commonly, of a core material, with an option of one or several layers of winding materials. The core can, for example, be made of either natural fibers, synthetic fibers, solid steel, or rope wire. Natural and synthetic fibers can either be a single fiber, e.g. a monofilament, or a fiber bundle, e.g. a multifilament. Examples of suitable fibers include animal gut, polyamide 66, and polyetheretherketone. The winding materials can be synthetic fiber, e.g. Perlon, or metal, e.g. aluminum, copper, or iron-chrome-aluminum stainless steel, or types of wire or ribbons, for example either round or flattened.

A winding layer consists of a strand of winding material, which has been wound onto the string, thereby covering the majority of the surface area of the string. The string is defined as the core plus any, if any, previously wound layers of winding. The strand of winding material can consist of one or several parallel strands of winding material, being wound onto the string simultaneously. The benefit of parallel winding is to speed up the winding process, as parallel strands will increase the total width of the winding strand, thereby reducing the number of string rotations required to cover the string with the new layer.

The cross-section of the winding materials can, for example, be circular, elliptical, oval, square, rectangular, rectangular with two or more rounded edges, or it can be a fiber bundle. Bowed musical instrument strings are produced by winding strands of winding materials around the core in layers, in order to add mass and thickness to the string. The reader should note that the future use of winding material or winding strand in this document, is taken to mean also any number of parallel strands of any given material.

Manufacturing musical strings requires specialized winding machinery. One example of a machine for producing wound musical strings is described in DE2736467 C3, where the core material is fastened between two hooks, which are aligned along the same axis, pointing towards each other. The hooks rotate simultaneously in the same direction and with the same speed. As the core is rotated, the winding strand is wound helically on to the core, such that the outer surface of the core is covered by the winding material, making the winding layer the new outer surface of the string. This is referred to as spinning the string. This process can be repeated a number of times, having from one to six winding layers making up the string, along with the central core. The winding strands can be wound onto the string by hand without any type of support, or it can be done using a supporting carriage. An example of a supporting carriage is seen in DE2736467 C3.

One important property of a wound musical string is the compactness of the core and winding layers. The compactness can be controlled by several parameters in the spinning process, including tension on the core during spinning and tension on the winding materials during spinning. However, these parameters have certain limitations. For example, the tension on the core is limited by the tension required of the string on the instrument to obtain the desired pitch, e.g. 440 hertz for a violin "A" string. Obviously, the core tension under string production cannot be much higher than the tension of the string on the instrument at the required pitch, as this would put the string in a relaxed state, relative to the manufacturing state, when on the instrument. The tension on the winding strands during spinning is limited by the physical strength of the winding materials. This is because when selecting winding materials, density and material dimensions must be considered, since these are critical for the overall diameter and required tension on the instrument of the finished string, which are important parameters for the end user. This means the tensile strength of the winding strand is finite, which limits the tension that can be put on the winding strand during spinning.

If a musical string lacks compactness, the core and one or more winding layers are not sufficiently interlocked with one another. If the layers are not interlocked when the string is under tension, as it is on an instrument, the individual layers may shift relative to one another. This layer shifting causes increased friction between the core and the layers and/or between the different layers, which leads to a less efficient energy transfer between the bow and the string, when the string is being played by a musician, meaning that some energy from the bow will be used to overcome the increased core/layer and/or layer/layer friction. A less efficient energy transfer between bow and string makes for a poorer string response, as well as increased acoustical damping, which ultimately reduces string projection and harmonic output. Reduced string response is especially undesirable when playing passages with quick transitions of the bow between the strings. String projection is very important when playing in large halls, and reduced harmonic output has a direct influence on the sound perceived by the listeners.

In GB 2 073 469 A an apparatus is described for modifying musical instrument strings, i.e. strings that are already playable, by flattening the crowns of the winding strands, which have substantially round cross-sections, wound around solid steel cores of guitar strings. The known apparatus comprises two rollers, which are able to press on the finished string, flattening the crowns of the winding wire as the string moves along through the rollers. The flattening process involves slowly rotating the musical string and moving it slowly in an axial direction through the rollers. Thus, said apparatus requires the roller to be translationally stationary relative to the room, with the string moving.

Accordingly, it is the aim of the present invention to provide a method and an apparatus for fabricating a string, in particular a string for a bowed musical instrument, said string having a core with at least one winding strand helically wound thereon, having at least one winding layer with increased compactness.

This aim is achieved by a method for fabricating a string, in particular a string for a bowed musical instrument, said string having a core with at least one winding strand helically wound thereon, thereby forming a string with at least one core and at least one winding layer, the method comprising:

placing a core axially along a path, spinning the core about its central axis and helically winding at least one winding strand around the string, preferably without overlaps between adjacent windings and/or large gaps between adjacent windings, of more than about 12% of the width of the individual winding strand, between adjacent windings, wherein for increasing compactness of the string, a friction force is applied to the at least one winding strand by a compactness increasing module at a spinning point, said spinning point being defined as the point where the at least one winding strand is being wound on to the string consisting of at least one core, and a compression force is applied to the at least one winding strand and the string by the compactness increasing module, when helically winding the at least one winding strand on to the string. The core/string is translationally stationary with respect to the room, with the compactness increasing module moving.

Furthermore, this aim is achieved by a string fabricating apparatus for fabricating a string, in particular a string for a bowed musical instrument, said string having a core with at least one winding strand helically wound thereon, thereby forming at least one winding layer, the apparatus comprising:

means for spinning a fixed core of a string, in particular a string for a bowed musical instrument, and for helically winding at least one winding strand on to said core as the core spins, thereby forming a string with at least one core and at least one winding layer, and a compactness increasing module configured to be in contact with the winding strand or a current uppermost winding strand at a spinning point when the winding strand or the current uppermost winding strand is wound onto the string consisting of at least one core, the spinning point being defined as the point where the at least one winding strand is being wound on to the string, such that a friction force is introduced at the spinning point between the compactness increasing module and the at least one winding strand during spinning, and a compression force leading to increased compression of the at least one winding strand and the string is introduced.

According to a special embodiment of the method, during spinning the compactness increasing module is moved, such that it follows the spinning point.

Preferably the compression force and/or the friction force is/are controlled.

According to a further special embodiment, at least one winding strand is wound around the string during the spinning step.

According to a further special embodiment, the compactness increasing module comprises two contact plates and the applied friction force is the result of bringing at least one of the two contact plates in contact with the at least one winding strand therebetween and the compression force applied by exerting force on the at least one winding strand and the string by at least one of the two contact plates.

According to a further special embodiment, the compactness increasing module comprises between one and six contact plates, said contact plates being arranged in pairs in series along the length of the core/string, each pair consisting of one top contact plate and one bottom contact plate and if the number of contact plates is odd, one or more of the pairs will lack either a top plate or a bottom plate, and the row of bottom contact plates will be shifted slightly along the length of the string, relative to the top row of contact plates.

According to a further special embodiment of a method, the or at last one pair of contact plates is arranged such that it spans an angle $\alpha \neq 0°$ in a plane that is perpendicular to the length direction of the core, preferably with a being less than 30°, preferably less than 15° and most preferably less than 8°.

Alternatively, or additionally the at or least one pair of contact plates is be arranged such that it spans an angle $\beta \neq 0°$ in a plane including the length direction of the core, preferably with $\beta$ being less than 30°, more preferably less than 15° and most preferably less than 8°.

It is also possible that a compactness increasing module comprises only one contact plate, said contact plate being shaped as an open ring, and the ring is arranged such that the core with or without one or more winding strands wound thereon passes through the ring.

According to a special embodiment of the string fabricating apparatus, the compactness increasing module is mounted on a carriage that is movable parallel to the length of the fixed core.

Preferably the carriage is configured to also support the at least one winding strand.

Conveniently, the compactness increasing module comprises a compression force controlling means for adjusting the amount of compression force applied.

Preferably, the compactness increasing module also comprises a friction force controlling means for adjusting the friction force applied. Said friction force controlling means could be integral with the compression force controlling means for adjusting the amount of compression force introduced.

According to a special embodiment, the compactness increasing module comprises two contact plates, one thereof being a lower contact plate and the other thereof being an upper contact plate, the lower of the two contact plates being mounted on the carriage, such that it is below the fixed core, preferably with no downward force exerted on the lower contact plate by the core/string before the upper contact plate presses down on the core/string, with the winding strand being wound thereon in direct contact with the lower contact plate, less than one full winding turn after winding onto the string and the upper contact plate being attached to the carriage such that it is above the fixed core and the upperside of the core with the at least one winding strand being wound thereon being in direct contact with the upper contact plate.

According to a further special embodiment, the compactness increasing module comprises between one and six contact plates, said contact plates being arranged in pairs in series along the length of the core, each pair consisting of one top contact plate and one bottom contact plate and if the number of contact plates is odd, one or more of the pairs will lack either a top plate or a bottom plate, and the row of bottom contact plates will be shifted slightly along the length of the string, relative to the top row of contact plates. Each pair can be either placed directly adjacent to its neighboring pair, or there may be a gap between the pairs. The compression force and the friction force of each pair of contact plates can be adjusted, independently of the neighboring pair(s) of contact plates. This allows for more diverse combinations of compression forces and friction forces, which may be beneficial in certain string configurations, e.g. strings where different winding materials are used for the same winding layer. Each bottom plate being fixed below the string and each top plate exerting individually adjustable downward forces on the string.

Preferably, the one or at least one pair of contact plates is angled with respect to one another.

In particular, the at least one pair of contact plates spans an angle $\alpha$*0° in a plane that is perpendicular to the length direction of the core.

Alternatively, or additionally, the at least one pair of contact plates spans an angle $\beta \neq 0°$ in a plane including the length direction of the core.

Conveniently, the contact surface of the contact plate or of at least one contact plate is coated with a surface coating.

According to a further special embodiment, the compactness increasing module comprises only one contact element, said contact element being shaped as an open ring arranged such that a core passes through it.

The compactness increasing module may be configured such that a radius of the ring can be increased or decreased.

The present invention is based on the surprising knowledge that an increased compactness of a wound string/winding layer can be achieved by introducing a compactness increasing module to the spinning process. The compactness increasing module can be in contact with the winding strand at the spinning point as the strand is wound onto the string, as well as the winding strand less than one full rotation around the string after the spinning point. The compactness increasing module can be designed in such a way that a winding strand is in contact with the upper and lower bounds of the compactness increasing module as the string rotates, thereby introducing a new source of friction at the spinning point, the increased friction being between the compactness increasing module and the winding strand, as well as introducing a compression of the current winding layer and the underlying string. Both the added friction and the compression add to an increased compactness of the winding layer and the underlying layers and/or core.

The compactness increasing module may be mounted on a carriage which also supports the winding strands. During spinning, the carriage follows the spinning point, meaning the carriage moves parallel to the string.

Due to the design of the compactness increasing module, one advantage is that the compactness increasing module allows for a much more controlled winding of several parallel strands of winding materials at once. When producing a musical string by hand, one challenge is the winding of two or more strands of winding materials at once, without introducing overlapping and/or large gaps between the strands. By using the compactness increasing module, upwards of five parallel strands can be wound onto the string at once, without introducing strand overlapping or undesired gaps.

Having overlapping of strands on the string creates an uneven surface with the winding strands due to a roof-tiling effect, where the first edge of the winding strand/winding turn overlaps (i.e. lies on top of) with the last edge of the previous strand/winding turn. This effect is uncomfortable for the musician as it makes the string rough under the fingers. This is undesirable, as some musicians play in excess of eight hours a day. Furthermore, there is also an increased risk of the bow getting stuck in the uneven windings of the string, leaving the string unplayable.

On the other hand, having gaps between the windings is also undesirable, as gaps present voids, in which dirt and dust can collect. Dirt and dust will increase the linear density of the string, but not in a continuous manner, as the added mass is only in the gaps, and not along the entire length of the string. As a result hereof, the string may exhibit impurity of the perfect fifth, causing the string to sound false and/or faulty.

Figures 2, 5:
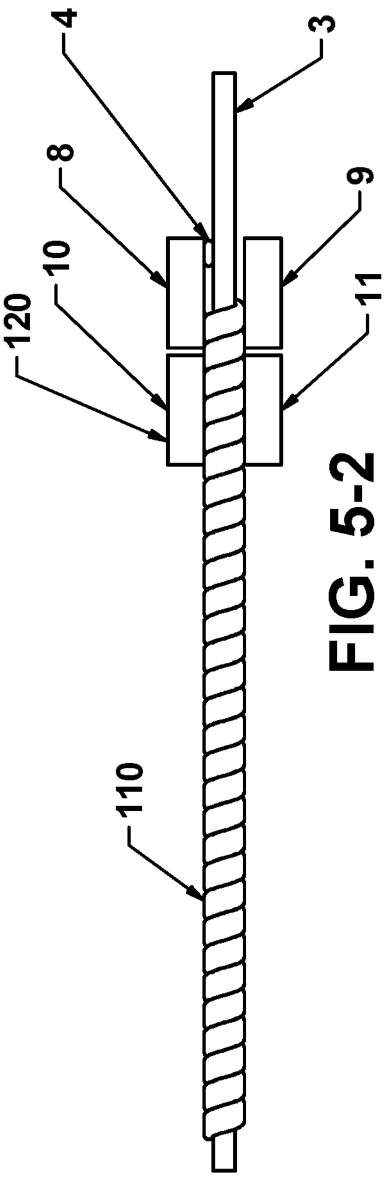
Figures 3, 5:
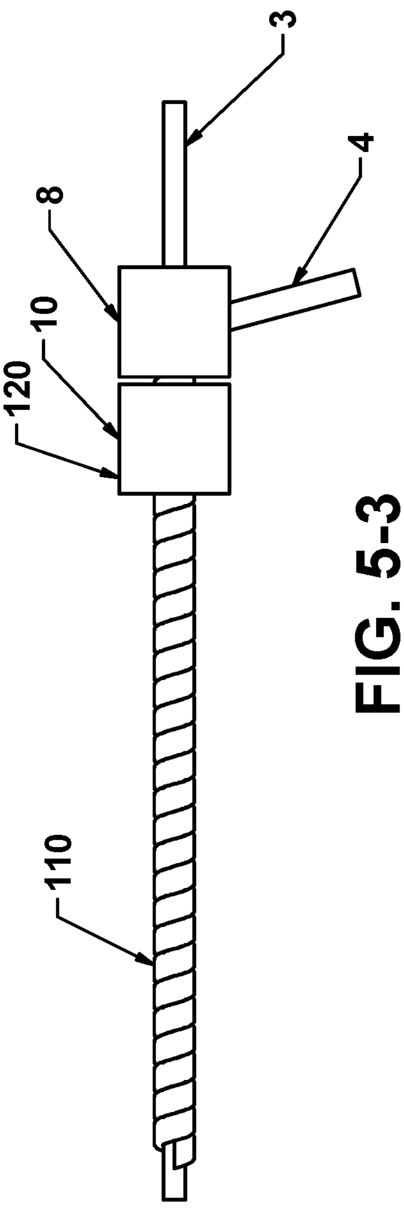
Figures 1, 5:
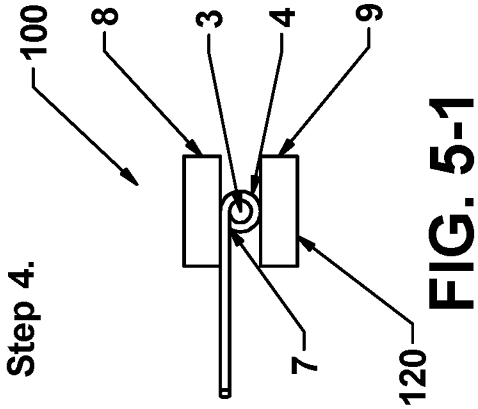
Figures 1, 2, 3, 6:
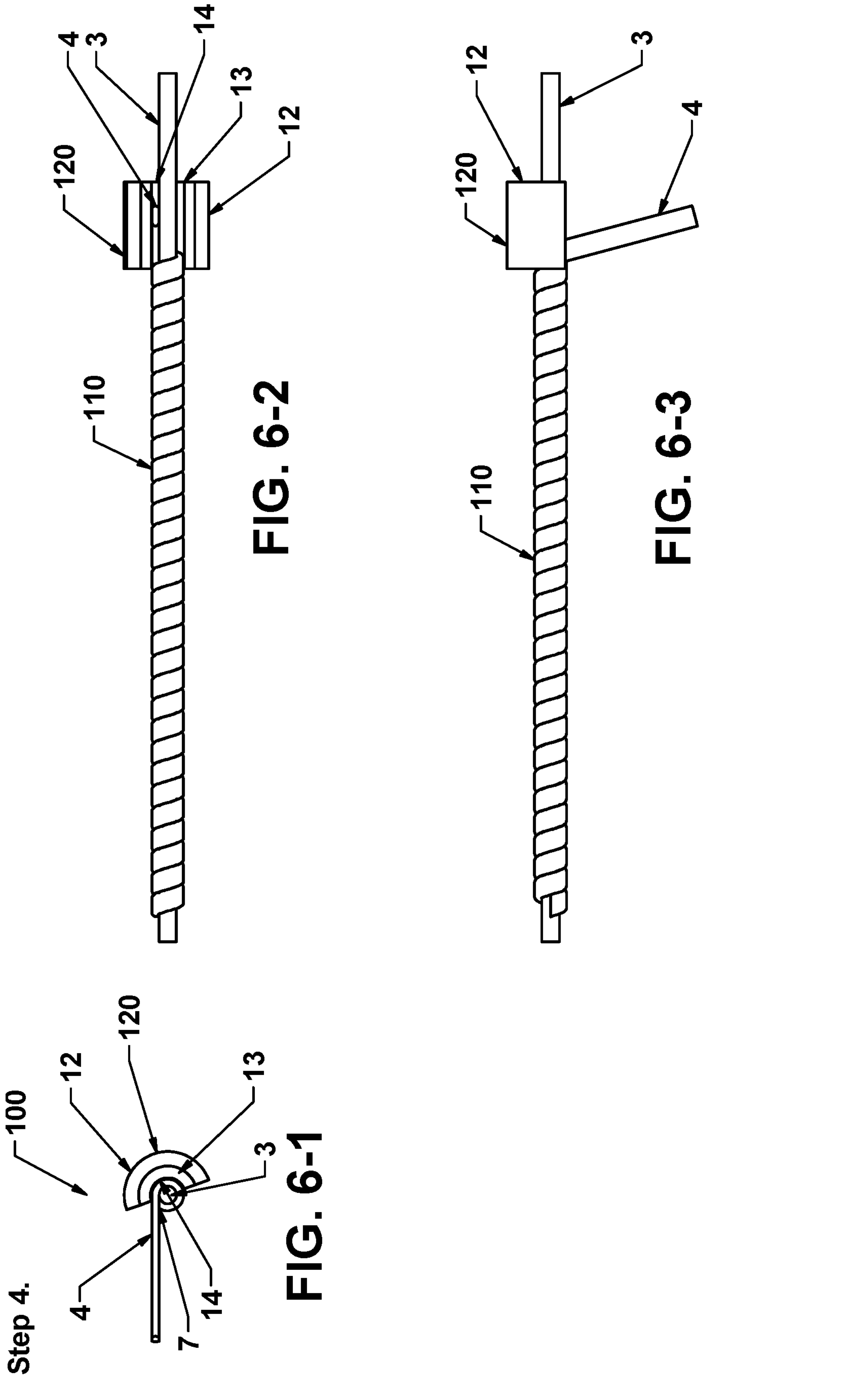
Figures 2, 7:
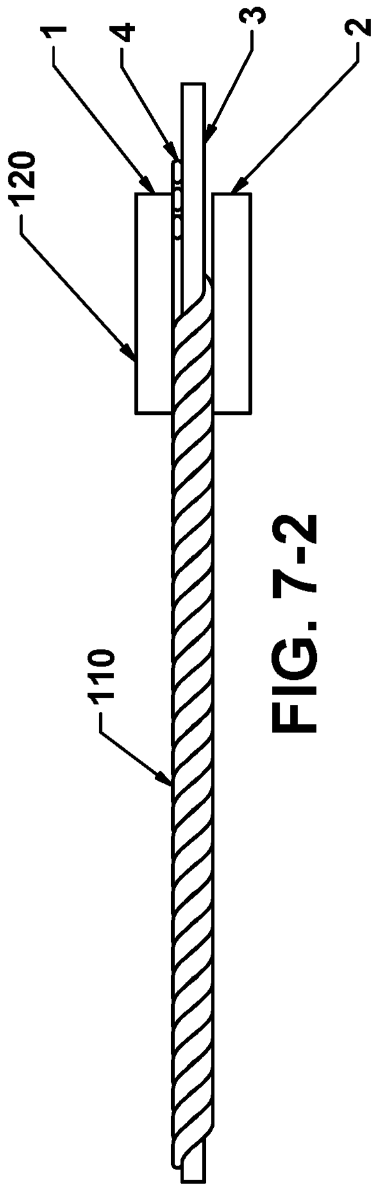
Figures 3, 7:
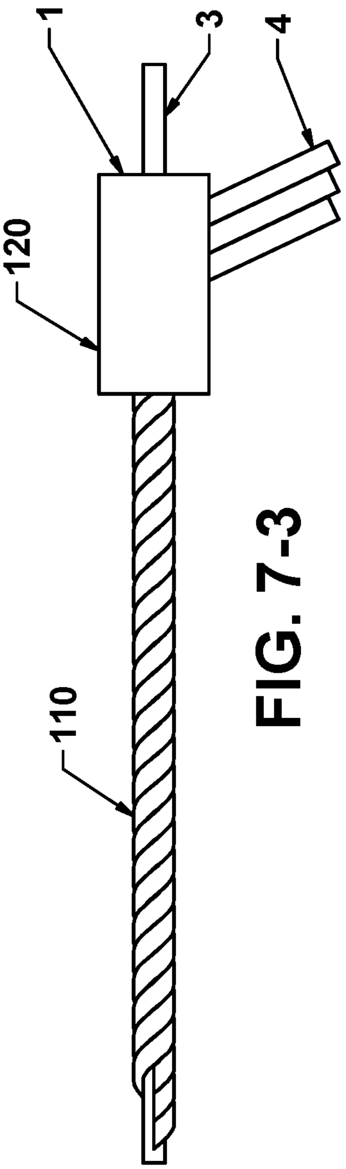
Figures 1, 7:
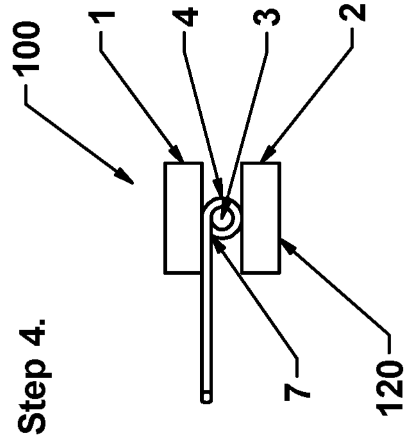

Further features and advantages of the present invention will be clear from the accompanying claims and the following description of special embodiments in combination with the schematic drawings, wherein FIGS. 1A to 1E (including FIGS. 1A-1-1A-4, FIGS. 1B-1-1B-3, FIGS. 1C-1-1C-3, FIGS. 1D-1-1D-4, and FIGS. 1E-1-1E-4) show steps of a method of fabricating a string, in particular a string for a bowed musical instrument, said string having a core with at least one winding strand helically wound thereon according to a first special embodiment of the invention;

FIGS. 2A to 2E (including FIGS. 2A-1-2A-4, FIGS. 2B-1-2B-3, FIGS. 2C-1-2C-3, FIGS. 2D-1-2D-3, and FIGS. 2E-1-2E-3) show steps of a method of fabricating a string, in particular a string for a bowed musical instrument, string having a core with at least one winding strand helically wound thereon according to a second special embodiment of the invention;

FIGS. 3-1-3-3 a modification of the steps shown in FIGS. 1D-1-1D-4 according to a special embodiment of the present invention;

FIGS. 4-1-4-3 a modification of the steps shown in FIGS. 1D-1-1D-4 according to a special embodiment of the present invention;

FIGS. 5-1-5-3 a modification of the steps shown in FIGS. 1D-1-1D-4 according to a special embodiment of the present invention;

FIGS. 6-1-6-3 a modification of the steps shown in FIGS. 1D-1-1D-4 according to a special embodiment of the present invention; and FIGS. 7-1-7-3 a modification of the steps shown in FIGS. 1D-1-1D-4 according to a special embodiment of the present invention.

For example FIGS. 1A-1 to 1A-4, 1B-1 to 1B-3. 1C-1 to 1C-3, 1D-1 to 1D-4, and 1E-1 to 1E-4 show a string fabricating apparatus 100 (FIG. 1A: upper left: front view; upper middle: side view; lower middle: top view) for fabricating a string, in particular a string for a bowed musical instrument, said string 110 having a core 3 with one winding strand 4 helically wound thereon according to a special embodiment of the present invention. Said apparatus 100 comprises means (not shown) for rotating the core 3, which is fixed, i.e. not moving, and for helically winding the winding strand 4 on said core 3 as the core rotates and a compactness increasing module 120 is configured to be in contact with the winding strand 4 at a spinning point 7 (FIGS. 1A-1, 1B-1, 1C-1, 1D-1 and 1E-4) when the winding strand 4 is wound onto the core 3. The spinning point being defined as the point where the winding strand 4 is being wound on to the core 3, such that a friction force is introduced at the spinning point 7, the friction force being applied to increase the friction between the compactness increasing module 120 and the winding strand 4, and a compression force being applied to compress the winding strand 4 and the core 3. A schematically depicted spinning means 300 is shown in FIG. 1A-2 and in FIG. 2A-2, together with arrows showing directions of rotation of the winding strand.

The compression increasing module 120 is mounted on a carriage 200 that is movable parallel to the length of the fixed core 3 and comprises two contact plates 1 and 2 (FIGS. 1A-1, 1A-4, 1B-1, 1B-2, 1B-3, 1C-1, 1C-2, 1C-3, 1D-1, 1D-3, 1D-4, 1E-2, 1E3 and 1E-4). The lower of the two contact plates 2 is mounted on the carriage 200 such that it is below the fixed core 3 and the underside of the core, with the winding strand 4 being wound thereon being in direct contact with the lower contact plate 2, preferably with no downward force exerted on the contact plate 2 by the core 3 with the winding strand 4 being wound thereon. The one upper contact plate 1 is mounted on the carriage 200 such that it is above the fixed core 3 and the upperside of the core 3 with the winding strand 4 being wound thereon is in direct contact with the upper contact plate 1 during winding. The carriage 200 is configured to also support the winding strand 4.

Furthermore, the compactness increasing module 120 comprises a force controlling means for adjusting the amount of compression force applied. Said force controlling means is also configured to adjust the friction force applied.

An arm (not shown) is carrying the upper contact plate 1 of the compactness increasing module 120.

The compactness increasing module 120 increases the compactness of the string 110, as the string is being spun, by increasing the compression force and friction. The friction is introduced at the contact point between the contact plates 1 and 2 and the winding strand 4, and the compression force comes from the arm carrying the upper plate 1 of the compactness increasing module 120, pressing down on the string 110, compressing the core 3 and winding strand 4 between the upper contact plate 1 and the lower contact plate 2.

The compression force being exerted by the compactness increasing module 120 onto the winding strand 4 and string 110 can be adjusted by the force controlling means. In the simplest case, the force controlling means may be a mechanism, consisting of a system of adding or removing mass from the movable arm of the compactness increasing module 120. Increasing the mass of the arm will increase the downward force exerted by the arm on the string 110. However, it may also be a force controlling means based on, for example, force from a variable spring constant, pneumatics, hydraulics, magnetism, or an application of the reverse piezoelectric effect. It is important to be able to adjust the force exerted on the string 110 from the compactness increasing module 120, because several different layers with several different materials may be wound onto the same string 110. The materials are carefully selected based on density and dimensions, in order for the final music string to have a desired thickness and tension on the instrument. Different materials and material dimensions require different compressions forces, thus making the adjustability of the force critical to obtain the optimal effect of the compactness increasing module 120. A force in the range for example between 0 newton and 25 newtons is sufficient for most applications of the compactness increasing module 120.

The frictional force being exerted by the compactness increasing module 120 onto the winding strand can be adjusted by the compression force as well. However, the friction has another controlling component, namely the choice of material for the contact plates. Different materials have different coefficients of friction, which introduces another parameter for adjusting the frictional force exerted by the compactness increasing module. It should be noted that the choice of material is limited by the hardness of the winding strand material. If the contact plate material is softer than the winding strand material, the contact plates will be easily scratched and damaged by the winding strand, which will reduce the effect of the compactness increasing module. A suitable material for the contact plates is for example ceramic or steel, particularly hardened or tool steel, either blank or with a suitable coating. Examples of coatings 6 (see for example FIGS. 2A-1, 2A-4, 2B-1, 2B-2, 2C-1, 2C-2, 2D-1, 2D-2, 2E-1 and to 2E-2) for the contact plates include carbon-based coatings, titanium nitride and chromium nitride. Most suitable coatings will be applied using physical or chemical vapor deposition (PVD or CVD). Also, the upper and lower contact plates may be coated with different coatings, or coatings consisting of more than one coating layer. Basically, any material with a suitable frictional coefficient, in particular a material with a low coefficient of friction, and with a hardness above that of the winding strand material will be sufficient. At all times the hardness of the contact plates will exceed that of the winding strand material being wound onto the string. By the correct choice of materials and coating, the frictional coefficient can be tuned to the desired value.

FIGS. 1A-1 through 1E-4 show steps of a method for fabricating a string, in particular a string for a bowed musical instrument, said string having a core with a winding strand helically wound thereon. In step 1 (FIGS. 1A-1 to 1A-4), a few windings of the winding strand 4 have been wound onto the core 3/string 110. This is to fasten the winding strand to the core 3/string 110. The contact plates 1 and 2 are not in contact with the core 3/string 110. In step 2 (FIGS. 1B-1 to 1B-3), the compactness increasing module 120 has been moved into place, and it is ready to apply increased frictional force and compression force to the winding strand 4 (the upper 1 and lower plates 2 of the compactness increasing module 120 are not yet in contact with the core 3/winding strand 4). In the step 3 (FIGS. 1C-1 to 1C-3), the compactness increasing module 120 has moved into contact with the core 3/string 110, but is still at the beginning (left side in FIG. 1C) of the core 3/string 110. Step 4 (FIGS. 1D-1 to 1D-4) illustrate the string 110 in the process of being wound, with the string 110 rotating, where the compactness increasing module 120 moves parallel to the string, following the spinning point 7 of the string 110 and winding strand 4. In step 5 (FIGS. 1E-1 to 1E-4), the compactness increasing module 120 has been released from the string 110, and the core 3/winding strand 4/string 110 has reached the desired level of compactness.

The apparatus 100 shown in FIGS. 2A-1 to 2A-4, 2B-1 to 2B-3, 2C-1 to 2C-3, 2D-1 to 2D-3 to 2E-1 to 2E-3 is different from the apparatus 100 shown in FIGS. 1A-1 through 1E-4 in that the contact plates 1 and 2 each comprise a coating 5 and 6 respectively, facing towards the core 3/string 110. By way of said apparatus a method for fabricating a string, in particular a string for a bowed musical instrument, said string having a core with at least one winding strand helically wound thereon as described before can be carried out.

FIGS. 3-1 to 3-3 show a further strand fabricating apparatus 100 for fabricating a string, in particular a string for a bowed musical instrument, said string 110 having a core 3 with (at least) one winding strand for helically wound thereon. Said apparatus differs from the apparatus 100 shown in FIGS. 1A-1 through 1E-4 in that the contact plates 1 and 2 are not parallel to each other but span an angle $\alpha$ in a plane that is perpendicular to the length direction of the core 3.

In particular, FIGS. 3-1 to 3-3 shows step 4 of above mentioned method.

The string fabricating apparatus 100 shown in FIGS. 4-1 to 4-3 is different from the apparatus shown in FIGS. 1A-1 through 1E-4 in that the contact plates 1 and 2 are not parallel to each other but span an angle $\beta$ in a plane including the length direction of the core 3. It also shows step 4 of above mentioned method.

FIGS. 5-1 to 5-3 show a string fabricating apparatus 100 that differs from the apparatus shown in FIGS. 1A-1 through 1E-4 in that it comprises two pairs of contact plates 1 and 2 arranged side-by-side in the length direction of the core 3. It also shows step 4 of above mentioned method.

FIGS. 6-1 to 6-3 show step 4 of the method described in connection with FIGS. 1A-1 through 1E-4. However, instead of one winding strand 4, three parallel winding strands 4 are simultaneously wound around the core 3.

In general, the compactness increasing module can be designed in a variety of ways, which all achieve the desired effect. The design described earlier, with the string wedged between one upper contact plate and one lower contact plate is simply one configuration. The same configuration can also be imagined with both contact plates being on movable arms, or the lower contact plate being on a movable arm with the upper contact plate being stationary. Also, the contact plate pair can be rotated between 0 and 90 degrees, such that the winding strand is at a non-right angle to the plates. It is also not required for the two contact plates to be parallel to one another. The contact plates can be at an angle between 0 and 90 degrees to one another, where an angle of 0 degrees means the contact plates are parallel to one another, and 90 degrees means the contact plates are perpendicular to one another. An angle less than 30° should be especially suitable, preferentially an angle less than 15°, most preferably less than 8°.

Another configuration of the invention is the compactness increasing module with between one and six contact plates, being arranged in pairs in series along the axis of the string, each pair consisting of one upper plate and one lower plate. If the number of contact plates is odd, one or more of the pairs will lack either an upper contact plate or a lower contact plate, or the upper and lower contact plates will be shifted, relative to each other, such that there is not a lower contact plate aligned directly below each top plate. Each pair can be either placed directly adjacent to its neighboring pair, or there may be a gap between the pairs. Also, each pair may be rotated to a desired configuration, as described above.

Yet another configuration according to an embodiment of the invention is a circular one. The compactness increasing module 120 (see FIGS. 7-1 to 7-3) may be designed such that it has a ring-shaped contact element. The ring 13 has an opening 14, which allows for the winding strand 4 to reach the core 3/string 110. The opening 14 may be for example between ¾ and ⅛th of the circumference of the circle. The core 3 passes through the ring 13. The compactness increasing module 120 has a contact region with the string 110, defined by the outer circumference of the string 110, the inner circumference of the ring 13, and the size of the opening 14 of the ring 13. The radius of the ring 13 can be increased or decreased by the use of, for example, piezo-electric actuators 12, placed on the outer circumference and/or the inner circumference of the ring 13. Because of a larger contact region between the compactness increasing module 120 and the winding strand 4, this configuration allows for a much larger frictional force being exerted on the winding strand 4 and string 110, but allows for only a smaller compression force, as there is no opposite part of the module to apply an equal but opposite force to the string. The compactness increasing module is mounted on a movable arm (not shown), which moves perpendicular to the string, with the string entering the center of the ring 13 via the ring opening 14. Alternatively, the compactness increasing module 120 may be mounted on a carriage (not shown), and the core 3 is passed through the ring 13, when it is being attached to hooks.

The compactness increasing module may be able to act on each winding layer as it is being wound onto the string, meaning that, in a finished string, which comprises a core and upwards of six different winding layers, the compactness increasing module can have acted on each individual layer, meaning that all layers may have been wound onto the string under increased compression force and increased frictional force. This differentiates the compactness increasing module at least according to a special embodiment of the present invention from the apparatus in GB2073469, which is described as a string modification apparatus, meaning it is able to modify an already playable string, as opposed to the compactness increasing module, which is an integrated part of the string production machinery and process.

Another distinction between at least a special embodiment of the present invention and the apparatus described in GB2073469 is that the apparatus is only able to modify the outermost layer of the string, and only if said outer layer has a substantially round cross-section. This introduces an additional manufacturing step to string production, or, at least limits the winding speed, as the apparatus is described as acting on the slowly moving string. This means that the compactness increasing module, which acts instantaneously on the string during spinning, causes little or no added production time or cost. Also, the compactness increasing module is able to apply compression and additional friction to any winding material, regardless of cross-sectional profile.

Furthermore, at least in a preferred embodiment, the contact surface between the winding material and the compression increasing module is completely different from the contact surface of the apparatus. In the apparatus, the contact point between the apparatus and the string is two rollers, which roll along the winding of the string, creating the desired effect. In the compactness increasing module, the contact surface between the module and the winding strand are, for example, rectangular plates, which are fixed in place and do not rotate. The fixed plates are a critical feature, as these can introduce a substantially larger frictional force than rollers can. Especially the difference in the contact surfaces is important for the distinction between the compactness increasing module and the invention of GB2073469, as the purpose of the compactness increasing module is not to flatten the outer layer, but to improve the compactness, and thus the response and acoustical output of the string, rather than noise reduction when rubbed axially by the fingers of the player, as is claimed for the apparatus in GB2073469. The, for example, rectangular plates should have an area between five and 200 square millimeters and minimum thickness of 0.1 millimeter. The two sides of the, for example, rectangular plates may be equal in length. The overall shape of the plates is not critical, as long as the shape allows for a sufficient contact point.

Depending on which end of the string 110 the winding is initiated and the direction of rotation of the string 110, either the upper contact plate or the lower contact plate of the compactness increasing module 120 is in contact with the spinning point. The contact plate of the compactness increasing module 120, which is not in contact with the spinning point 7, will be in contact with the winding strand 4, immediately after it has been wound onto the string, on the opposite side of the string 110. At least one of either the upper contact plate or the lower contact plate of the compactness increasing module 120 must be attached to the arm, which can move up and down perpendicular to the string, such that the compactness increasing module 120 can be attached and detached from the string 110.

It should be noted that the invention is not limited to the exact specifications stated in this application, as a person skilled in the art of string production and/or machine construction should be able to make obvious changes and improvements to both design and operation of the compactness increasing module.

FIGS. 3-1 through 7-3 are marked here as relating to a modification of only step 4 shown in FIGS. 1D-1 to 1D-4. However, of course there may be further modifications to the entire process shown in FIGS. 1A-1 to 1E-4. In addition, the step shown in FIGS. 3-1 through 7-3 could be steps of a method different from the method shown in FIGS. 1A-1 to 1E-4. The modifications made to the compactness increasing module shown in FIGS. 3-1 through 7-3 may be applied to all steps shown in FIGS. 1A-1 to 1E-4 and 2A-1 to 2E-3.

The features in the foregoing description, in the claims and/or in the accompanying drawings may, both and in any combination thereof, be material for realizing the invention in diverse forms thereof.

REFERENCE SIGN LIST

1, 2 contact plates
3 core
4 winding strand
5 coating
6 coating
7 spinning point
12 bending actuator
100 apparatus
110 string
120 compactness increasing module
13 ring
14 opening
α angle
β angle

The invention claimed is:

1. Method for fabricating a string having a cylindrical core with at least one winding strand helically wound thereon, the method comprising:
- placing a cylindrical core axially along a path,
- spinning the cylindrical core about its central axis and helically winding at least one winding strand around the cylindrical core at a spinning point, the spinning point being a point of first contact between the cylindrical core and the at least one winding strand,
- applying at the spinning point both a friction force and a compression force to the at least one winding strand by a compactness increasing module, while helically winding the at least one winding strand around the cylindrical core, wherein during spinning the compactness increasing module is moved, such that the compactness increasing module follows the spinning point.

2. The method of claim 1, wherein the compression force and/or the friction force is/are controlled.

3. The method of claim 1, wherein the at least one winding strand is wound around the cylindrical core during the spinning step.

4. The method of claim 1, wherein the friction force and the compression force result from bringing at least one contact plate into contact with the at least one winding strand during the applying.

5. The method of claim 4, wherein the compactness increasing module comprises between two and six said contact plates, said contact plates being arranged in pairs in series along a length of the core/string, each pair consisting of one top contact plate and one bottom contact plate and if the number of contact plates is odd, one or more of the pairs will lack either a top plate or a bottom plate, and a row of bottom contact plates will be shifted slightly along the length of the string, relative to a top row of contact plates.

6. The method of claim 4, wherein each pair of contact plates is arranged such that each pair spans an angle $\alpha \neq 0°$ in a plane that is perpendicular to a length direction of the cylindrical core with α being less than 30°.

7. The method of claim 4, wherein each pair of contact plates is arranged such that each pair spans an angle $\beta \neq 0°$ in a plane including a length direction of the cylindrical core, with β being less than 30°.

8. The method according to claim 1, wherein the string is a string for a bowed musical instrument.

9. The method according to claim 1 wherein in the spinning, the at least one winding strand is wound around the cylindrical core without overlaps between adjacent windings and/or without large gaps between adjacent windings of more than about 12% of the width of the individual winding strand, between adjacent windings.

10. Method for fabricating a string having a cylindrical core with at least one winding strand helically wound thereon, the method comprising:
- placing a cylindrical core axially along a path,
- spinning the cylindrical core about its central axis and helically winding at least one winding strand around the cylindrical core at a spinning point, the spinning point being a point of first contact between the cylindrical core and the at least one winding strand,
- applying at the spinning point both a friction force and a compression force to the at least one winding strand by a compactness increasing module, while helically winding the at least one winding strand around the cylindrical core, wherein the compactness increasing module comprises only one contact plate, said contact plate being shaped as an open ring, and the ring is arranged such that the cylindrical core with or without one or more winding strands wound thereon passes through the ring, and wherein during spinning the compactness increasing module is moved, such that the compactness increasing module follows the spinning point.

11. The method according to claim 10, wherein the string is a string for a bowed musical instrument.

12. The method according to claim 10 wherein in the spinning, the at least one winding strand is wound around the cylindrical core without overlaps between adjacent windings and/or without large gaps between adjacent windings of more than about 12% of the width of the individual winding strand, between adjacent windings.

13. String fabricating apparatus for fabricating a string having a cylindrical core with at least one winding strand helically wound thereon, the apparatus comprising:
- means for spinning a fixed cylindrical core of a string about its central axis, and means for helically winding at least one winding strand on to said cylindrical core at a spinning point, the spinning point being a point of first contact between the cylindrical core and the at least one winding strand as the cylindrical core spins, thereby forming a string with at least one cylindrical core and at least one winding layer, and
- a compactness increasing module configured to be in contact with the at least one winding strand or a current uppermost winding strand at the spinning point when the at least one winding strand or the current uppermost winding strand is wound onto the string, such that both a friction force and a compression force are applied at the spinning point between the compactness increasing module and the at least one winding strand during spinning, leading to increased compression of the at least one winding strand and the string, wherein the compactness increasing module comprises at least one contact plate, wherein during spinning the compactness increasing module is moved, such that the compactness increasing module follows the spinning point.

14. The apparatus according to claim 13, wherein the compactness increasing module is mounted on a carriage that is movable parallel to a length of the fixed cylindrical core.

15. The apparatus according to claim 14, wherein the carriage is configured to also support the at least one winding strand.

16. The apparatus according to claim 13, wherein the compactness increasing module comprises a compression force controlling means for adjusting the amount of compression force introduced.

17. The apparatus according to claim 13, wherein the compactness increasing module also comprises a friction force controlling means for adjusting the amount of friction force introduced.

18. The apparatus according to claim 14, wherein the compactness increasing module comprises at least two contact plates, one thereof being a lower contact plate and the other thereof being an upper contact plate, the lower of the at least two contact plates being mounted on the carriage such that the lower contact plate is below the fixed cylindrical core, with the at least one winding strand being wound thereon in direct contact with the lower contact plate, less than one full winding turn after winding onto the string, and the upper contact plate being attached to the carriage such that the upper contact plate is above the fixed cylindrical core and an upper side of the cylindrical core with the at least one winding strand being wound thereon being in direct contact with the upper contact plate during spinning.

19. The apparatus according to claim 13, wherein the compactness increasing module comprises between two and six said contact plates, said contact plates being arranged in pairs in series along a length of the cylindrical core, each pair consisting of one top contact plate and one bottom contact plate and if the number of contact plates is odd, one or more of the pairs will lack either a top plate or a bottom plate, and a row of bottom contact plates will be shifted slightly along a length of the string, relative to top row of contact plates.

20. The apparatus according to claim 18, wherein at least one of the at least two contact plates are angled with respect to one another.

21. The apparatus according to claim 20, wherein the at least two contact plates span an angle $\alpha \neq 0°$ in a plane that is perpendicular to a length direction of the cylindrical core.

22. The apparatus according to claim 20, wherein the at least two contact plates span an angle $\beta \neq 0°$ in a plane including a length direction of the cylindrical core.

23. The apparatus according to claim 18, wherein a contact surface of the at least two contact plates is coated with a surface coating.

24. The apparatus according to claim 13, wherein the string is a string for a bowed musical instrument.

25. String fabricating apparatus for fabricating a string, having a cylindrical core with at least one winding strand helically wound thereon, the apparatus comprising:

means for spinning a fixed cylindrical core of a string about its central axis, and means for helically winding at least one winding strand on to said cylindrical core at a spinning point, the spinning point being a point of first contact between the cylindrical core and the at least one winding strand as the cylindrical core spins, thereby forming a string with at least one cylindrical core and at least one winding layer, and a compactness increasing module configured to be in contact with the at least one winding strand or a current uppermost winding strand at the spinning point when the at least one winding strand or the current uppermost winding strand is wound onto the string, such that both a friction force and a compression force are applied at the spinning point between the compactness increasing module and the at least one winding strand during spinning, leading to increased compression of the at least one winding strand and the string, wherein the compactness increasing module comprises one contact element, said contact element being shaped as an open ring arranged such that the core passes through the open ring, wherein during spinning the compactness increasing module is moved, such that the compactness increasing module follows the spinning point.

26. The apparatus according to claim 25, wherein the compactness increasing module is configured such that the radius of the ring can be increased or decreased.

27. The apparatus according to claim 25, wherein the string is a string for a bowed musical instrument.

* * * * *